United States Patent
Jeppsson Karlin et al.

(10) Patent No.: US 11,800,040 B2
(45) Date of Patent: Oct. 24, 2023

(54) BLACK LEVEL DRIFT

(71) Applicant: Axis AB, Lund (SE)

(72) Inventors: Johan Jeppsson Karlin, Lund (SE); Jimmie Jönsson, Lund (SE)

(73) Assignee: AXIS AB, Lund (SE)

(*) Notice: Subject to any disclaimer, the term of this patent is extended or adjusted under 35 U.S.C. 154(b) by 235 days.

(21) Appl. No.: 17/326,332

(22) Filed: May 21, 2021

(65) Prior Publication Data

US 2021/0377425 A1    Dec. 2, 2021

(30) Foreign Application Priority Data

Jun. 2, 2020   (EP) .................................... 20177843

(51) Int. Cl.
*H04N 5/16*   (2006.01)
*H04N 5/57*   (2006.01)
(Continued)

(52) U.S. Cl.
CPC ............... *H04N 5/165* (2013.01); *H04N 5/57* (2013.01); *H04N 25/63* (2023.01); *H04N 9/64* (2013.01)

(58) Field of Classification Search
CPC ...................................................... H04N 9/73
(Continued)

(56) References Cited

U.S. PATENT DOCUMENTS

2005/0195290 A1* 9/2005 Takeshita ............... H04N 23/88
                                                              348/223.1
2008/0297816 A1  12/2008 Nikkanen et al.
(Continued)

FOREIGN PATENT DOCUMENTS

CN    101843089 A    9/2010
CN    102265325 A    11/2011
(Continued)

OTHER PUBLICATIONS

Office Action dated Aug. 16, 2023 in Chinese Patent Application No. 202110597236.8, citing above-listed references, 6 pages.

*Primary Examiner* — Xi Wang
(74) *Attorney, Agent, or Firm* — XSENSUS LLP

(57) ABSTRACT

The present disclosure relates to a method performed by a deviation analyzing system (1) for black level drift assessment of a digital camera image sensor (21). The deviation analyzing system measures (1001) for pixels of an image captured by the image sensor, a respective luminance value and corresponding chromaticity value of each pixel. The deviation analyzing system further determines (1002) a respective average chromaticity value for differing luminance levels of the measured luminance values, based on for each luminance level averaging the corresponding measured chromaticity values. Moreover, the deviation analyzing system determines (1003), when the respective average chromaticity values of a range (4) of luminance levels indicate—to a predeterminable extent—chromaticity deviations (5) from the respective average chromaticity values (6) of other luminance levels (7), that a black level setting of the image sensor is drifted from a true black level.

The disclosure also relates to a deviation analyzing system in accordance with the foregoing, a digital camera comprising such a deviation analyzing system, and a respective corresponding computer program product and non-volatile computer readable storage medium.

13 Claims, 4 Drawing Sheets

(51) Int. Cl.
*H04N 25/63* (2023.01)
*H04N 9/64* (2023.01)

(58) Field of Classification Search
USPC ........................................ 348/223.1
See application file for complete search history.

(56) References Cited

U.S. PATENT DOCUMENTS

2016/0275660 A1  9/2016  Yamamoto
2019/0122347 A1  4/2019  Case
2020/0043151 A1  2/2020  Case

FOREIGN PATENT DOCUMENTS

CN   106878634 A   6/2017
CN   107454405 A   12/2017

* cited by examiner

BLACK LEVEL DRIFT

CROSS-REFERENCE TO RELATED APPLICATION

The present application claims priority to European patent application 20177843.8, filed Jun. 2, 2020, the entire contents of which being incorporated herein by reference.

TECHNICAL FIELD

The present disclosure relates to black level drift assessment of a digital camera image sensor.

BACKGROUND

With the use of digital cameras such as video cameras, it may be possible—for instance for surveillance purposes—to capture what is happening in specific surroundings, such as in an office, an industrial site, a part of a city, an open square, a city block, a road etc., as it is happening and/or at a later occasion. Images of the surroundings i.e. scenes, may assist in providing insights and information related to said scenes, which may be revealing and/or of interest in one way or another.

A recurring issue with image processing of a captured image, relates to black level drift, i.e. that a black level setting of a digital camera image sensor with which an image may be captured, is erroneous i.e. drifted as compared to a true black level. This drift may for instance occur over time, relate to temperature variations, and/or be due to characteristics and/or tolerance variations of the image sensor. As image processing may be pushed further with e.g. local tone mapping, the issue of black level drift becomes even more relevant. Since a black level error is an offset on a true signal, the relative error may be largest for small signals, i.e. dark areas and/or near black colors. The error may be amplified by gain applied to the image, and since with e.g. white balance there may be applied different gains for e.g. red (R), green (G) and blue (B), this error may be visible as a colored tint in the dark area(s), typically green or magenta, depending on if the drift is positive or negative.

To overcome black level drift issues, it is known to attempt to determine a black level error of a camera image sensor, and subsequently to adjust image sensor settings based thereon to presumably correlate with a true black level. Determining an image sensor black level drift may, however, be difficult, complicated and/or expensive, and thus remains a challenge.

SUMMARY OF THE INVENTION

It is therefore an object of embodiments herein to provide an approach for in an improved and/or alternative manner assessing black level drift of a digital camera image sensor.

The object above may be achieved by the subject-matter disclosed herein. Embodiments are set forth in the appended claims, in the following description and in the drawings.

The disclosed subject-matter relates to a method performed by a deviation analyzing system for black level drift assessment of a digital camera image sensor. The deviation analyzing system measures for pixels of an image captured by the image sensor, a respective luminance value and corresponding chromaticity value of each pixel. The deviation analyzing system further determines a respective average chromaticity value for differing luminance levels of the measured luminance values, based on for each luminance level averaging the corresponding measured chromaticity values. Moreover, the deviation analyzing system determines, when the respective average chromaticity values of a range of luminance levels indicate—to a predeterminable extent—chromaticity deviations from the respective average chromaticity values of other luminance levels, that a black level setting of the image sensor is drifted from a true black level.

The disclosed subject-matter further relates to a deviation analyzing system for black level drift assessment of a digital camera image sensor. The deviation analyzing system comprises a pixel measuring unit for—and/or adapted for—measuring, for pixels of an image captured by the image sensor, a respective luminance value and corresponding chromaticity value of each pixel. The deviation analyzing system further comprises an average determining unit for—and/or adapted for—determining a respective average chromaticity value for differing luminance levels of the measured luminance values, based on for each luminance level averaging the corresponding measured chromaticity values.

Moreover, the deviation analyzing system comprises a deviation determining unit for—and/or adapted for—determining, when the respective average chromaticity values of a range of luminance levels indicate—to a predeterminable extent—chromaticity deviations from the respective average chromaticity values of other luminance levels, that a black level setting of the image sensor is drifted from a true black level.

Furthermore, the disclosed subject-matter relates to a digital camera comprising a deviation analyzing system as described herein.

Moreover, the disclosed subject-matter relates to a computer program product comprising a computer program containing computer program code means arranged to cause a computer or a processor to execute the steps of the deviation analyzing system described herein, stored on a computer-readable medium or a carrier wave.

The disclosed subject-matter further relates to a nonvolatile computer readable storage medium having stored thereon said computer program product.

Thereby, there is introduced an approach according to which there may be determined an offset from a true black level, in settings of a digital camera image sensor. That is, since there is measured for pixels of an image captured by the image sensor, a respective luminance value and corresponding chromaticity value of each pixel, luminance and chromaticity may be derived for respective pixel of the captured image. Moreover, that is, since there is determined a respective average chromaticity value for differing luminance levels of the measured luminance values based on for each luminance level averaging the corresponding measured chromaticity values, by grouping together measured chromaticity values for pixels having identical—and/or essentially identical—measured luminance values and averaging those chromaticity values, a respective average chromaticity value may be established for respective luminance value level. Accordingly, a respective determined average chromaticity level may be mapped to a respective luminance level. Furthermore, that is, since there is determined when the respective average chromaticity values of a range of luminance levels indicate—to a predeterminable extent—chromaticity deviations from the respective average chromaticity values of other luminance levels, that a black level setting of the image sensor is drifted from a true black level, by assessing the determined average chromaticity values, it may be established—if the average chromaticity values for a portion of consecutive luminance levels deviate to an extent deemed sufficient from the average chromaticity values for other luminance levels which e.g. may indicate an essentially constant chromaticity level—that the image sensor has an erroneous black level setting that is offset from a true black level. That is, assuming the known grey world principle—commonly used for instance in white balance applications—with the underlying logic that an average surface color and/or reflectance in an image with enough different surfaces is grey, with the concept introduced herein the respective determined average chromaticity values may be expected to be constant or essentially constant, i.e. be of the same or essentially the same chromaticity level, for a correct black level image sensor setting. With an erroneous black level setting, however, it is expected that the grey world principle becomes invalid, especially in the dark areas such as for low luminance levels, which with the concept introduced herein is detected by establishing that determined average chromaticity values of a range of e.g. dark area luminance levels deviate to a sufficient extent from determined e.g. constant average chromaticity values of other e.g. higher luminance levels.

For that reason, an approach is provided for in an improved and/or alternative manner assessing black level drift of a digital camera image sensor.

The technical features and corresponding advantages of the above mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
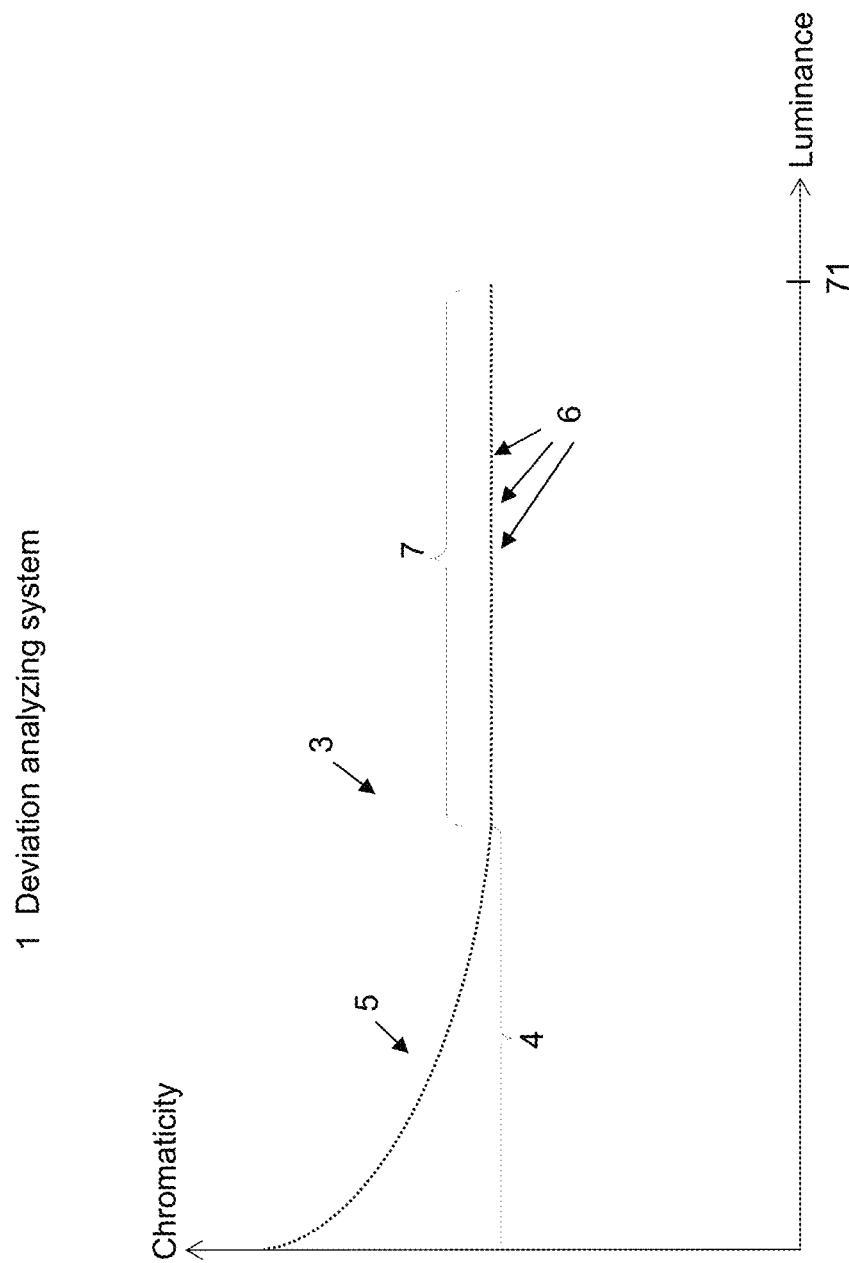
FIG. 1 illustrates a schematic view of exemplifying chromaticity as a function of luminance determined by an exemplifying deviation analyzing system according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to black level drift assessment of a digital camera image sensor, there will be disclosed an approach according to which there may be determined an offset from a true black level, in settings of a digital camera image sensor.

Referring now to the figures and FIG. 1 in particular, there is depicted a schematic view of exemplifying chromaticity as a function of luminance determined by an exemplifying deviation analyzing system 1 according to embodiments of the disclosure. It may be noted that, for illustrative purposes, the luminance and chromaticity axes of FIG. 1 not are to scale.

Figure 3:
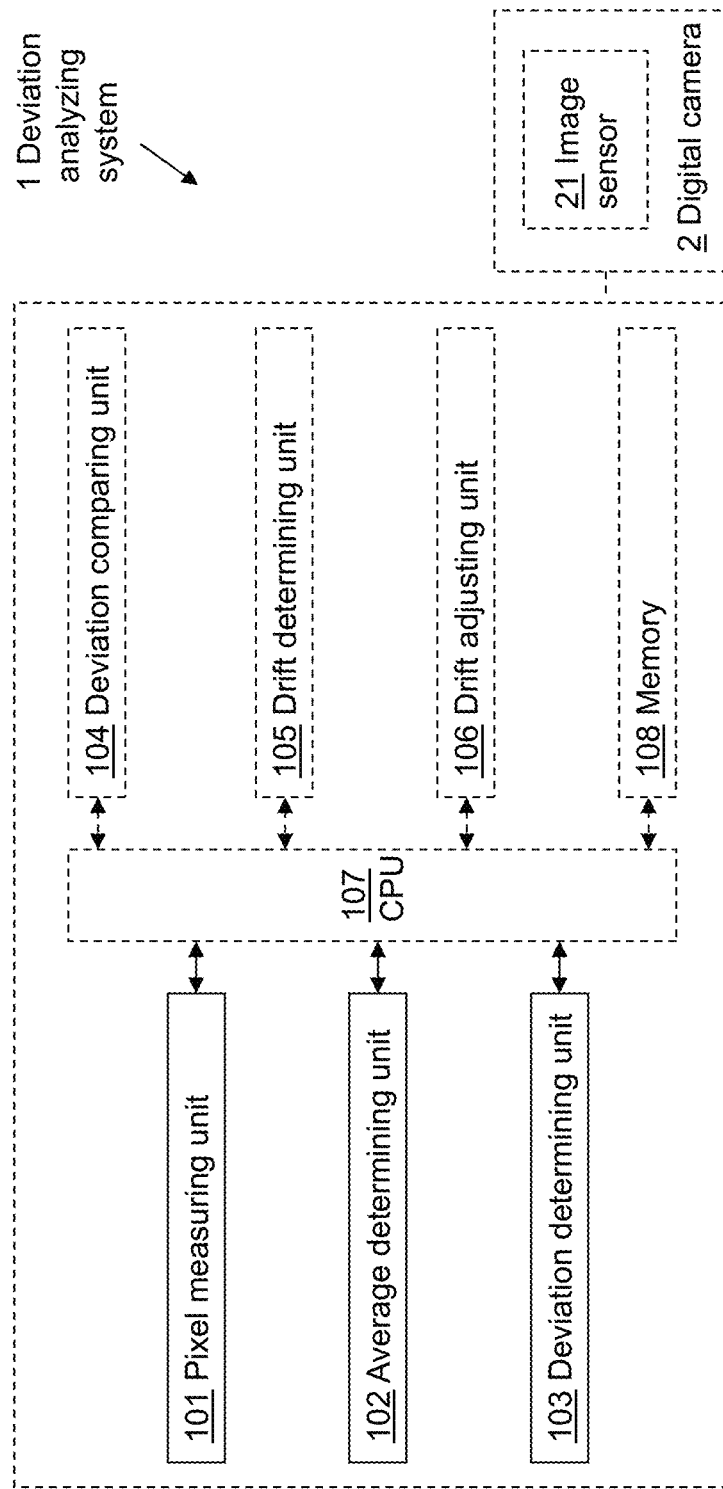
FIG. 3 is a schematic block diagram illustrating an exemplifying deviation analyzing system according to embodiments of the disclosure.

The deviation analyzing system 1 is adapted for black level drift assessment of an image sensor 21 of a digital camera 2 (shown in FIG. 3). The digital camera 2 may refer to any arbitrary—e.g. known—digital camera, such as a digital video camera. Said digital camera 2 may further, according to an example, be comprised in a digital camera arrangement and/or network comprising additional components, for instance being part of an exemplifying surveillance system. Moreover, the image sensor 21 of the digital camera 2 may refer to any arbitrary—e.g. known—image sensor, adapted for image capturing. Said image sensor 21 may at least partly be comprised in said digital camera 2, and/or be at least partly provided thereon and/or in association therewith. A scene which the digital camera 2 and/or image sensor 21 thereof may be adapted to capture may be represented by any arbitrary scene, such as an office, an industrial site, a part of a city, an open square, a city block, a road etc. Said scene may further optionally be a scene of interest for surveillance. Moreover, the deviation analyzing system 1 may be comprised in the digital camera 2. Alternatively, the deviation analyzing system 1 may for instance be provided at least partly outside the digital camera 2, such as in the exemplifying digital camera arrangement or surveillance system discussed above, and/or in one or more servers. The digital camera 2, the image sensor 21 and/or the deviation analyzing system 1 may further support—and/or comprise components supporting—image processing, such as e.g. white balancing, local tone mapping, etc.

The phrase "deviation analyzing system" may refer to "processing system", "black level drift analyzing system" and/or "image sensor settings analyzing system", whereas "for black level drift assessment of a digital camera image sensor" may refer to "for black level drift assessment of a digital video camera image sensor" and/or "for image sensor settings assessment of a digital camera image sensor". Moreover, the phrase "black level drift assessment of a digital camera image sensor" may refer to "black level drift assessment of at least a first digital camera image sensor" and/or "black level drift assessment of one or more digital camera image sensors", and according to an example, further to "black level drift assessment of an image sensor of a surveillance digital camera" and/or "black level drift assessment of an image sensor of a digital camera adapted for capturing a scene for surveillance".

The deviation analyzing system 1 is—e.g. by means of a pixel measuring unit 101 (shown in FIG. 3)—adapted and/or configured for measuring, for pixels of an image captured by the image sensor 21, a respective luminance value and corresponding chromaticity value of each pixel. Thereby, luminance and chromaticity may be derived for respective pixel—and/or for respective pixel of a portion of the pixels—of the captured image.

The luminance and chromaticity values of respective pixel of the image may depend on the scene captured, such as e.g. characteristics of one or more objects e.g. persons therein, along with circumstances and/or conditions under which said image was captured, such as e.g. lighting conditions, weather conditions etc. Moreover, the image may be captured—and/or have been captured—in any arbitrary—e.g. known—feasible manner by the digital camera image sensor 21, and further, the image may refer to any arbitrary captured image. The respective luminance value and corresponding chromaticity value of each pixel of the image may be measured and/or be derived in any arbitrary—e.g. known—feasible manner. Moreover, the luminance values and/or chromaticity values may be quantified in any arbitrary—e.g. known—feasible manner, for instance based on a commonly known RGB color model.

The phrase "measuring for pixels of an image" may refer to "deriving, detecting, identifying and/or determining for pixels of an image" and/or "measuring for pixels of at least a first image", and further to "measuring for each of at least a portion of pixels of an image" and/or "measuring for each of at least a predeterminable portion of pixels of an image". It may further be noted that "image sensor" throughout the disclosure may be equated with "digital camera image sensor". Moreover, the phrase "respective luminance value and corresponding chromaticity value of each pixel" may refer to "respective luminance value and associated chromaticity value of each pixel" and/or "respective luminance value and respective chromaticity value of each pixel", and further to "luminance value and corresponding chromaticity value for respective pixel". "Luminance value", on the other hand, may according to an example refer to "RGB based luminance value", whereas "chromaticity value" according to an example may refer to "RGB based chromaticity value" and/or "R/G, B/G and/or R/B chromaticity value".

The deviation analyzing system 1 is—e.g. by means of an average determining unit 102 (shown in FIG. 3)—adapted and/or configured for determining a respective average chromaticity value for differing luminance levels of the measured luminance values, based on for each luminance level averaging the corresponding measured chromaticity values. Thereby, by grouping together measured chromaticity values for pixels having identical—and/or essentially identical—measured luminance values and averaging those chromaticity values, a respective average chromaticity value may be established for respective luminance value level. Accordingly, a respective determined average chromaticity level may be mapped to a respective luminance level, which in FIG. 1 is illustrated as an exemplifying plotted graph 3 comprising determined average chromaticity as a function of luminance levels.

The luminance levels may differ from one another to any arbitrary feasible extent, such as by exemplifying one unit, ten units, one tenth of a unit etc., and the extent may further vary between different luminance values. Moreover, averaging the chromaticity values for respective luminance level may be accomplished in any arbitrary feasible manner, such as by calculating a respective mean, median and/or weighted chromaticity value for respective luminance level. Moreover, averaging the chromaticity values for a specific luminance level may comprise averaging all measured chromaticity values for said specific luminance level, or a selected and/or predeterminable portion thereof.

The phrase "determining a respective average chromaticity value" may refer to "calculating and/or deriving a respective average chromaticity value", whereas "average chromaticity value" may refer to "representative chromaticity value" and according to an example further to "mean and/or median chromaticity value" and/or "weighted average chromaticity value". The phrase "for differing luminance levels", on the other hand, may refer to "for luminance levels differing to a predeterminable extent", "for differing luminance level ranges", "for at least a portion of differing luminance levels" and/or "for at least a predeterminable portion of differing luminance levels", whereas "luminance level" may refer to "luminance value level". Moreover, "differing luminance levels" may refer to "respective luminance level" and/or "respective unique luminance level". The phrase "based on for each luminance level averaging the corresponding measured chromaticity values", on the other hand, may refer to "based on for each luminance level calculating an average, weighted average, mean value and/or mean value of the corresponding measured chromaticity values", "based on for each of a plurality of different luminance levels averaging the corresponding measured chromaticity values" and/or "based on for each luminance level averaging at least a portion and/or at least a predeterminable portion of the corresponding measured chromaticity values".

As exemplified in FIG. 1, the deviation analyzing system 1 is—e.g. by means of a deviation determining unit 103 (shown in FIG. 3)—adapted and/or configured for determining when the respective average chromaticity values of a range 4 of luminance levels indicate—to a predeterminable extent—chromaticity deviations 5 from the respective average chromaticity values 6 of other luminance levels 7, that a black level setting of the image sensor 21 is drifted from a true black level. Thereby, by assessing the determined average chromaticity values, it may be established—if the average chromaticity values for a portion 4 of consecutive luminance levels deviate to an extent 5 deemed sufficient from the average chromaticity values 6 for other luminance levels 7 which e.g. may indicate an essentially constant chromaticity level—that the image sensor 21 has an erroneous black level setting that is offset from a true black level. That is, assuming the known grey world principle—commonly used for instance in white balance applications—with the underlying logic that an average surface color and/or reflectance in an image with enough different surfaces is grey, with the concept introduced herein the respective determined average chromaticity values may be expected to be constant or essentially constant, i.e. be of the same or essentially the same chromaticity level, for a correct black level image sensor setting. With an erroneous black level setting, however, it is expected that the grey world principle becomes invalid, especially in the dark areas such as for low luminance levels, which with the concept introduced herein is detected by establishing that determined average chromaticity values of a range 4 of luminance levels—such as dark area luminance levels—deviate 5 to a sufficient extent from determined average chromaticity values 6—which may be expected to be essentially constant—of other luminance levels 7 such as higher luminance levels.

The range 4 of luminance levels may be represented by any portion of consecutive luminance levels out of the measured luminance levels, and further comprise any arbitrary feasible number of luminance levels. Optionally, the range 4 may comprise low luminance levels as compared to a highest determined luminance level 71, such as luminance levels lower than fifteen percent, preferably lower than ten percent and more preferred lower than five percent of the highest determined luminance level 71. Thereby, since it for an erroneous black level setting as discussed above is expected that the grey world principle becomes invalid especially in the dark areas such as for low luminance levels, which with the concept introduced herein is detected by establishing that determined average chromaticity values of a range 4 of luminance levels—such as dark area luminance levels—then deviates 5 to a sufficient extent from determined average chromaticity values 6 of other e.g. higher luminance levels 7, an offset of the black level may be more easily detected for relatively low luminance levels.

The chromaticity deviations 5 may be represented by any arbitrary feasible anomaly and/or anomalies of the determined average chromaticity values of the luminance levels range 4 as compared to the determined average chromaticity values 6 of the other luminance levels 7, and for instance be represented by deviating from a constant chromaticity level, as illustrated in an exemplifying manner in FIG. 1. Should a black level setting of the image sensor 21 be set too high as compared to a true black level, then the chromaticity deviations 5 may—as illustrated in an exemplifying FIG. 1—be represented by higher average chromaticity values for the luminance range 4 as compared to average chromaticity values 6—which may be of a constant chromaticity level— of other luminance levels 7 of the measured luminance values. In a similar manner, to the contrary, should a black level setting of the image sensor 21 be set too low as compared to a true black level, then the chromaticity deviations 5 may be represented by lower average chromaticity values for the luminance range 4 as compared to average chromaticity values 6 of other luminance levels 7. Optionally, the chromaticity deviations 5 may comprise increasing deviation of respective average chromaticity value with decreasing luminance level. Thereby, as illustrated in an exemplifying manner in FIG. 1, the chromaticity anomaly 5 may increase the lower the luminance level.

The extent by which the chromaticity deviations 5 should differ from the respective average chromaticity values 6 of other luminance levels 7 in order to be deemed to reflect that a black level setting of the image sensor 21 is drifted from a true black level, may be arbitrarily selected as deemed feasible and/or relevant, e.g. in view of the implementation at hand. Said extent may for instance be stipulated in magnitude and/or percentage, and may further differ from one luminance level to another, e.g. with increasing deviation required the lower the luminance level. Moreover, the true black level may be represented by any arbitrary feasible luminance value and/or level applicable for the implementation at hand, such as zero or essentially zero. It may be noted that in order to avoid luminance values derived from the image sensor 21 to range around zero, that luminance values derived from the image sensor 21 in a commonly known manner may come with a voluntary and/or intended predeterminable offset, which for instance may be set in view of choice of AD converter. For instance, when utilizing a 12 bit AD converter providing a resolution of 4096 in a known manner, a voluntary offset may be set to an exemplifying value of 200, whereas when utilizing a 10 bit AD converter providing a resolution of 1024 in a known manner, a voluntary offset may be set to an exemplifying value of 50. It may further be noted that such an optional voluntary luminance offset may need to be compensated for—such as the value thereof being subtracted—prior to further luminance values processing and/or handling.

The phrase "determining [ . . . ] that a black level setting of the image sensor is drifted from a true black level" may refer to "identifying that a black level setting of the image sensor is drifted from a true black level", whereas "when the respective mean chromaticity values [ . . . ] indicate" may refer to "provided that, if and/or should the respective mean chromaticity values [ . . . ] indicate". Moreover, "respective chromaticity values of a range of luminance levels" may refer to "respective chromaticity values of a consecutive range of luminance levels", whereas "range of luminance levels" may refer to "portion of consecutive luminance levels". The phrase "indicate—to a predeterminable extent—chromaticity deviations", on the other hand, may refer to "demonstrate and/or reflect—to a predeterminable extent—chromaticity deviations", "differ—to a predeterminable extent—from" and/or "indicate chromaticity deviations—which exceed one or more predeterminable thresholds and/or criteria—". Moreover, the phrase "to a predeterminable extent" may refer to "predeterminable magnitude and/or percentage". The phrase "chromaticity deviation from the respective average chromaticity values", on the other hand, may refer to "chromaticity anomaly from the respective average chromaticity values" and/or "a deviating chromaticity profile as compared to the respective average chromaticity values". Furthermore, the phrase "chromaticity deviations from the respective average chromaticity values of other luminance levels" may according to an example refer to "chromaticity deviations from a constant or essentially constant average chromaticity value", "chromaticity deviations from otherwise equivalent or essentially equivalent respective average chromaticity values of the other luminance levels", "chromaticity deviations from the respective average chromaticity values of the other and/or the remaining luminance levels" and/or "chromaticity deviations from respective average chromaticity values of luminance levels of a predeterminable other range of the luminance levels". Furthermore, the phrase "that a black level setting of said image sensor is drifted from a true black level" may refer to "that a black level setting of said image sensor has drifted from a true black level", "that a black level setting of said image sensor is offset from, deviates from and/or is erroneous as compared to a true black level" and/or "that there is an image sensor black level drift from a true black level", whereas "true black level" may refer to "assumed and/or fictive true black level" and/or "correct black level". Moreover, "setting" and/or "settings" may throughout the disclosure refer to "one or more parameters and/or configurations".

Figure 2:
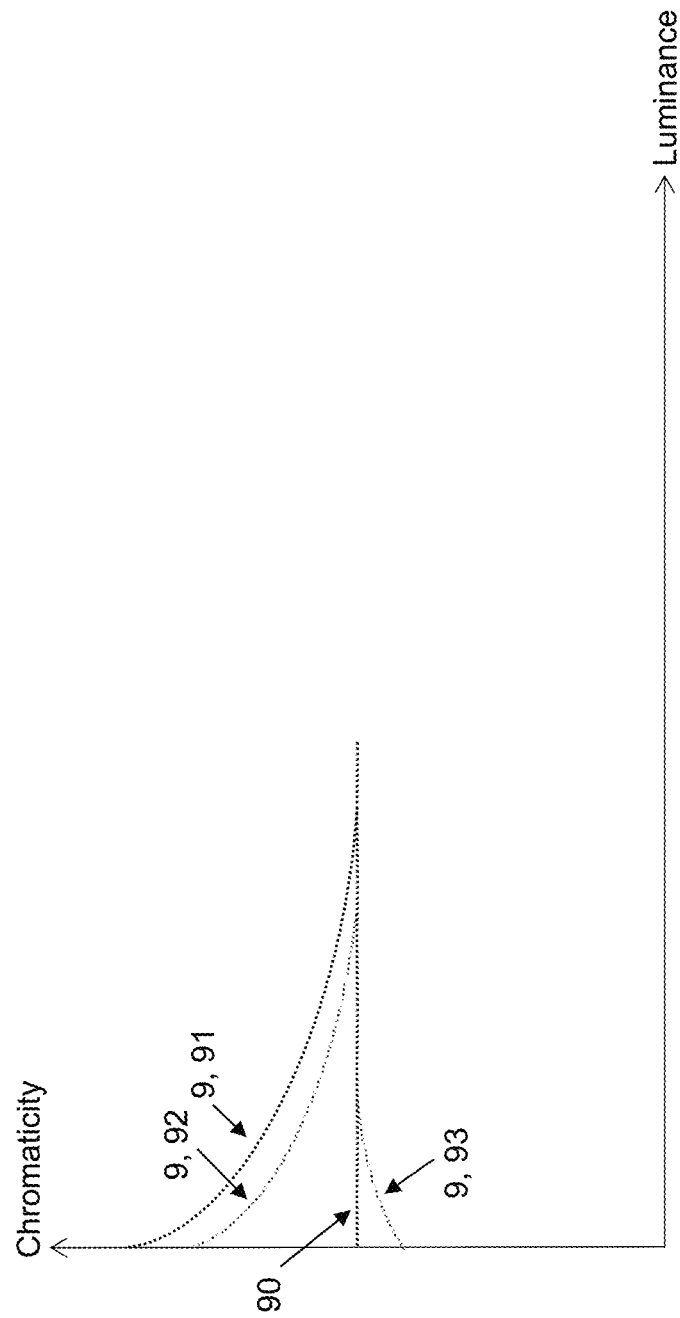
FIG. 2 illustrates a schematic view of exemplifying differing candidates of theoretical chromaticity deviations according to embodiments of the disclosure.

Determination of the black level drift may be accomplished in various manners, using the determined chromaticity deviations 5 as input. Optionally, however, as exemplified in FIG. 2, which illustrates a schematic view of exemplifying differing candidates 9 of theoretical chromaticity deviations according to embodiments of the disclosure, the deviation analyzing system 1 may—e.g. by means of a deviation comparing unit 104 (shown in FIG. 3)—be adapted and/or configured for comparing the chromaticity deviations 5 to one or more differing candidates 9 of predetermined theoretical chromaticity deviations expected for the range 4 for a respective differing theoretical black level drift in view of characteristics and/or image processing settings of the image sensor 21. The deviation analyzing system 1 may then—e.g. by means of an drift determining unit 105 (shown in FIG. 3)—be adapted and/or configured for determining when a matching candidate 91 is found, that a black level drift of the image sensor 21 is equivalent to the theoretical black level drift of the matching candidate 91. Thereby, by comparing the chromaticity deviations 5 with— and finding a match 91 among—predetermined theoretical candidates 9 respectively having differing fictive chromaticity deviations representing and reflecting differing fictive black level offsets, a current black level drift of the image sensor 21 may be identified as the fictive black level offset of the matching candidate 91.

The matching candidate 91 may be found by comparison of at least a portion of the chromaticity deviations 5 with at least a portion—at least partly overlapping the luminance value range 4—of one or more the candidates 9. The matching candidate 91 may further be considered to match when said candidate 91 at least to a predeterminable extent matches the chromaticity deviations 5. Respective candidate of the differing candidates 9 may be based on a unique fictive black level offset, and subsequently, respective candidate may reflect unique theoretical chromaticity deviations. Depending on the differing theoretical black level offsets of the differing candidates 9, the respective theoretical chromaticity deviations deviate from one another. Respective theoretical chromaticity deviations may further be—and/or have been—determined and/or calculated based on and/or taking into consideration characteristics and/or image processing settings corresponding to—and/or expected to correspond to—those of the applicable and/or expected image sensor 21. The differing candidates 9 may e.g. be pre-stored, such as in an exemplifying database, for instance in the deviation analyzing system 1 and/or be retrievable with support therefrom.

The one or more differing candidates 9 may be represented by any arbitrary number of candidates 9. Further, the differing candidates 9 may have been determined and/or calculated to provide theoretical chromaticity deviations covering—and/or extending along—any arbitrary number of theoretical luminance levels and/or values, such as e.g. ranging along lower regions and/or black areas thereof. Moreover, respective theoretical black level drifts of the differing candidates 9 may each be represented by any arbitrary feasible different fictive offset from a true black level, for instance ranging from an offset of one or two units up to tens or even hundreds of units. In exemplifying FIG. 2, a first theoretical offset associated with a first candidate 91, here found to be the matching candidate 91, is a positive two-units offset—e.g. represented by the value two—from a true black level e.g. represented by the value zero. In a similar manner, an exemplifying second theoretical offset associated with a second candidate 92, is a positive one-unit offset e.g. represented by the value one, whereas an exemplifying third theoretical offset associated with a third candidate 93, is a negative one-unit offset e.g. represented by the value minus one. Since the exemplifying first and second candidates are based on positive fictive offsets, their respective associated fictive chromaticity deviations 91, 92 may—as depicted in exemplifying FIG. 2—comprise chromaticity values and/or levels that are greater than a luminance-independent exemplifying constant chromaticity level 90 representative of a zero-offset from a true black level. Since the exemplifying third candidate, to the contrary, is based on a negative fictive offset, its associated fictive chromaticity deviations 93 may—as depicted in exemplifying FIG. 2—comprise chromaticity values and/or levels that are lower than said constant chromaticity level 90.

The phrase "comparing said chromaticity deviations" may refer to "comparing at least a portion of said chromaticity deviations", whereas "differing candidates" may refer to "differing sets" and/or "different and/or unique candidates". The phrase "predetermined theoretical chromaticity deviations", on the other hand, may refer to "predeterminable and/or pre-stored theoretical chromaticity deviations", "predetermined fictive and/or imaginary chromaticity deviations" and/or "predetermined theoretical luminance-dependent chromaticity deviations". According to an example, "theoretical chromaticity deviations" may refer to "theoretical chromaticity profiles, models, curves and/or plotted curves". Moreover, "theoretical chromaticity deviations expected for said range" may refer to "theoretical chromaticity deviations applicable, feasible and/or expected for said range", whereas "differing theoretical black level drift" may refer to "different and/or unique theoretical black level drift", "differing fictive and/or imaginary black level drift" and/or "differing theoretical black level offset". The phrase "in view of characteristics and/or image processing settings of said image sensor", on the other hand, may refer to "in view of characteristics and/or image processing settings corresponding to or essentially corresponding to those of said image sensor", "in view of expected characteristics and/or image processing settings of an image sensor", "pertinent characteristics and/or image processing settings of said image sensor" and/or "based on characteristics and/or image processing settings of said image sensor", and according to an example further to "in view of settings of an image sensor". Furthermore, the phrase "when a matching candidate is found" may refer to "when a matching candidate is found among said candidates", "when a matching candidate is deemed found" and/or "when a matching candidate is found based on said chromaticity deviations to a predeterminable extent correlating with, coinciding with and/or resembling a matching candidate". The phrase "that a black level drift of said image sensor is equivalent to the theoretical black level drift of said matching candidate", on the other hand, may refer to "that a black level drift of said image sensor is essentially equivalent to and/or is near the theoretical black level drift of said matching candidate".

Adjustment of the black level settings of the digital camera image sensor 21 may be accomplished in various manners, using as input the determined chromaticity deviations 5 and gained knowledge that a black level setting of said image sensor 21 is drifted from a true black level. Optionally, however, the deviation analyzing system 1 may—e.g. by means of a drift adjusting unit 106 (shown in FIG. 3)—be adapted and/or configured for adjusting the black level setting of the image sensor 21 based on the theoretical black level drift of the matching candidate 91. Thereby, based on the theoretical black level offset of the found matching candidate 91 identified to be equal or essentially equal to a current or essentially current black level drift of the image sensor 21, an image sensor black level setting may be adjusted accordingly to reflect a true or presumably true black level. The phrase "adjusting the black level setting" may refer to "setting the black level setting", whereas "based on said theoretical black level drift of said matching candidate" may refer to "based on the determined black level drift".

Further optionally, the deviation analyzing system 1 may—e.g. by means of the drift adjusting unit 106—be adapted and/or configured for adjusting the black level setting based on the theoretical black level drift of the matching candidate 91 when chromaticity deviations of one or more further captured images match the matching candidate 91. Thereby, by prior to adjustment of an image sensor black level setting taking into consideration black level drift assessment as described herein of one or more additional images—which similarly may be found to match the matching candidate 91—an approach is provided which may be deemed more robust. The phrase "one or more further captured images" may refer to "one or more further images captured by said image sensor" and/or "one or more additional captured images".

As further shown in FIG. 3, the deviation analyzing system 1 may comprise a pixel measuring unit 101, an average determining unit 102, a deviation determining unit 103, an optional deviation comparing unit 104, an optional drift determining unit 105 and an optional drift adjusting unit 106, all of which already have been described in greater detail above. Furthermore, the embodiments herein for black level drift assessment of a digital camera image sensor 21, may be implemented through one or more processors, such as a processor 107, here denoted CPU, together with computer program code for performing the functions and actions of the embodiments herein. Said program code may also be provided as a computer program product, for instance in the form of a data carrier carrying computer program code for performing the embodiments herein when being loaded into the deviation analyzing system 1. One such carrier may be in the form of a CD ROM disc, optical disc, solid state disk, flash memory and/or a hard drive, it is however feasible with other data carriers. The computer program code may furthermore be provided as pure program code on a server and downloaded to the deviation analyzing system 1. The deviation analyzing system 1 may further comprise a memory 108 comprising one or more memory units. The memory 108 may be arranged to be used to store e.g. information, and further to store data, configurations, schedulings, and applications, to perform the methods herein when being executed in the deviation analyzing system 1. For instance, the computer program code may be implemented in the firmware, stored in FLASH memory 108, of an embedded processor 107. Furthermore, said units 101-106, the optional processor 107 and/or the optional memory 108 may at least partly be comprised in, associated with and/or be connected to the digital camera 2 and/or for instance a surveillance system optionally comprising said digital camera 2. Those skilled in the art will also appreciate that said units 101-106 described above may refer to a combination of analog and digital circuits, and/or one or more processors configured with software and/or firmware, e.g. stored in a memory such as the memory 108, that when executed by the one or more processors such as the processor 107, perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, Soc.

Figure 4:
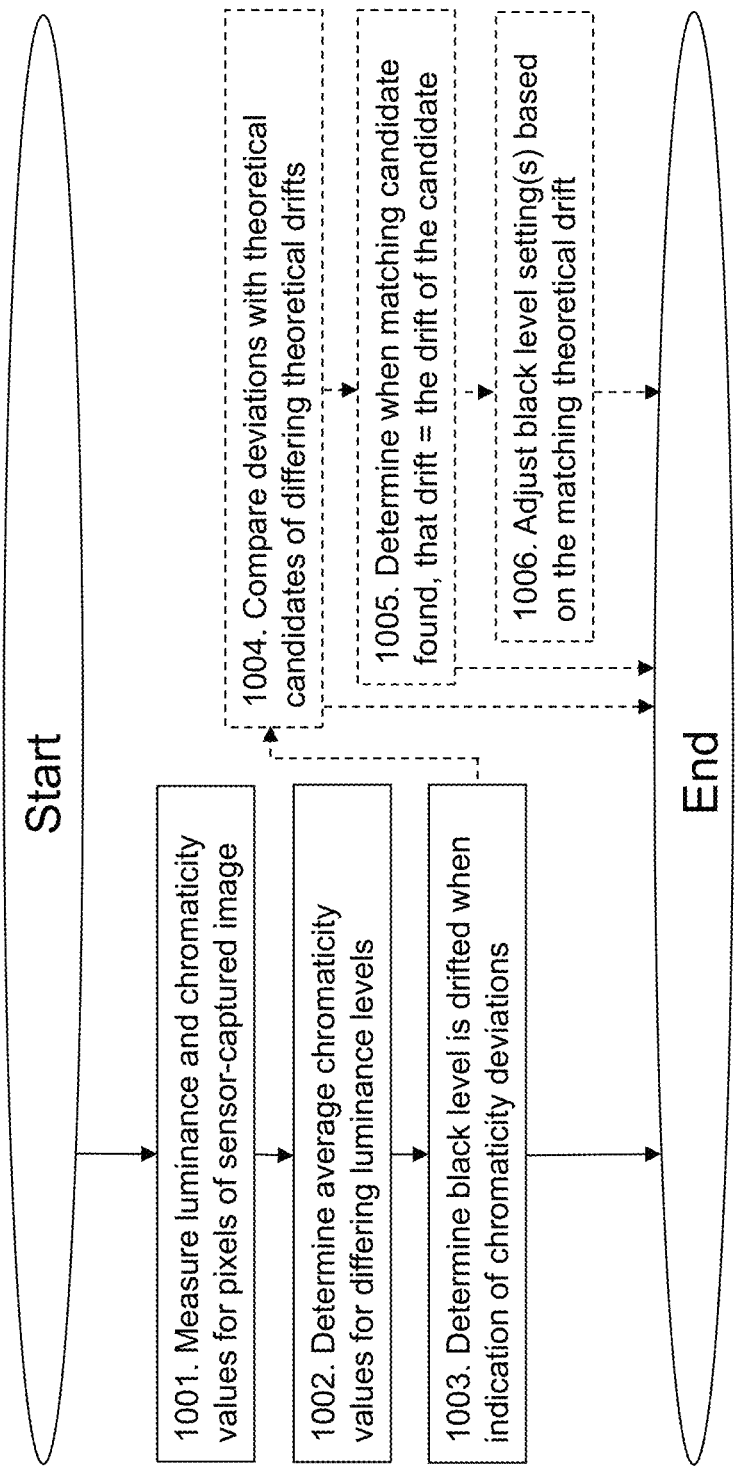
FIG. 4 is a flowchart depicting an exemplifying method performed by a deviation analyzing system according to embodiments of the disclosure.

FIG. 4 is a flowchart depicting an exemplifying method performed by a deviation analyzing system 1 according to embodiments of the disclosure. Said method is for black level drift assessment of a digital camera image sensor 21. The exemplifying method, which may be continuously repeated, comprises one or more of the following actions discussed with support from FIGS. 1-3. Moreover, the actions may be taken in any suitable order and/or one or more actions may be performed simultaneously and/or in alternate order where applicable.

Action 1001

In Action 1001, the deviation analyzing system 1 measures for pixels of an image captured by said image sensor 21—e.g. with support from the pixel measuring unit 101—a respective luminance value and corresponding chromaticity value of each pixel.

Action 1002

In Action 1002, the deviation analyzing system 1 determines—e.g. with support from the average determining unit 102—a respective average chromaticity value for differing luminance levels of the measured luminance values, based on for each luminance level averaging the corresponding measured chromaticity values.

Action 1003

In Action 1003, the deviation analyzing system 1 determines—e.g. with support from the deviation determining unit 103—when the respective average chromaticity values of a range 4 of luminance levels indicate—to a predeterminable extent—chromaticity deviations 5 from the respective average chromaticity values 6 of other luminance levels 7, that a black level setting of the image sensor 21 is drifted from a true black level.

Optionally, the chromaticity deviations 5 may comprise increasing deviation of respective average chromaticity value with decreasing luminance level.

Further optionally, the range 4 may comprises low luminance levels as compared to a highest determined luminance level 71, such as luminance levels lower than fifteen percent, preferably lower than ten percent and more preferred lower than five percent of the highest determined luminance level 71.

Action 1004

In optional Action 1004, the deviation analyzing system 1 may compare—e.g. with support from the optional deviation comparing unit 104—the chromaticity deviations 5 to one or more differing candidates 9 of predetermined theoretical chromaticity deviations expected for the range 4 for a respective differing theoretical black level drift in view of characteristics and/or image processing settings of the image sensor 21.

Action 1005

In optional Action 1005, which may follow upon optional Action 1004, the deviation analyzing system 1 may determine—e.g. with support from the optional drift determining unit 105—when a matching candidate 91 is found, that a black level drift of the image sensor 21 is equivalent to the theoretical black level drift of the matching candidate 91.

Action 1006

In optional Action 1006, which may follow upon optional Action 1004 and/or optional Action 1005, the deviation analyzing system 1 may adjust—e.g. with support from the optional drift adjusting unit 106—the black level setting of the image sensor 21 based on the theoretical black level drift of the matching candidate 91.

Optionally, the adjusting of Action 1006 may comprise adjusting the black level setting based on the theoretical black level drift of the matching candidate 91 when chromaticity deviations of one or more further captured images match the matching candidate 91.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a deviation analyzing system for black level drift assessment of a digital camera image sensor, said method comprising:

measuring for each of at least a substantial portion of pixels of an image captured by said image sensor, a respective luminance value and corresponding chromaticity value of each pixel;

determining a respective average chromaticity value for differing luminance levels of the measured luminance values, based on for each luminance level averaging the corresponding measured chromaticity values; and determining when the respective average chromaticity values of a range of consecutive luminance levels indicate—to a predeterminable extent—chromaticity deviations from the respective average chromaticity values of other luminance levels indicating a constant and/or essentially constant chromaticity level, that a black level setting of said image sensor is drifted from a true black level, wherein said range comprises low luminance levels as compared to a highest determined luminance level, lower than fifteen percent of said highest determined luminance level.

2. The method according to claim 1, wherein said chromaticity deviations comprise increasing deviation of respective average chromaticity value with decreasing luminance level.

3. The method according to claim 1, further comprising:

comparing said chromaticity deviations to one or more differing candidates of predetermined theoretical chromaticity deviations covering and/or extending along theoretical luminance levels, which theoretical chromaticity deviations are expected for said range for a respective differing theoretical black level drift, which is an offset from a true black level, in view of characteristics and/or image processing settings of said image sensor; and determining when a matching candidate is found, that a black level drift of said image sensor is equivalent to the theoretical black level drift of said matching candidate.

4. The method according to claim 3, further comprising:

adjusting the black level setting of said image sensor based on said theoretical black level drift of said matching candidate.

5. The method according to claim 4, wherein said adjusting the black level setting comprises adjusting the black level setting based on said theoretical black level drift of said matching candidate when chromaticity deviations of one or more further captured images match said matching candidate.

6. A digital camera comprising a deviation analyzing system according to claim 1.

7. A non-transitory computer program product comprising a computer program containing computer program code arranged to cause a computer or a processor to execute the method according to claim 1.

8. A non-volatile computer readable storage medium having stored thereon the computer program product of claim 7.

9. A deviation analyzing system for black level drift assessment of a digital camera image sensor, said deviation analyzing system comprising:

a controller configured to measure each of at least a substantial portion of pixels of an image captured by said image sensor, a respective luminance value and corresponding chromaticity value of each pixel;

determine a respective average chromaticity value for differing luminance levels of the measured luminance values, based on for each luminance level averaging the corresponding measured chromaticity values; and determine when the respective average chromaticity values of a range of consecutive luminance levels indicate—to a predeterminable extent—chromaticity deviations the respective average chromaticity values of other luminance levels indicating a constant and/or essentially constant chromaticity level, that a black level setting of said image sensor is drifted from a true black level, wherein said range comprises low luminance levels as compared to a highest determined luminance level, lower than fifteen percent of said highest determined luminance level.

10. The deviation analyzing system according to claim 9, wherein said chromaticity deviations comprise increasing deviation of respective average chromaticity value with decreasing luminance level.

11. The deviation analyzing system according to claim 9, wherein the controller is further configured to compare said chromaticity deviations to one or more differing candidates of predetermined theoretical chromaticity deviations covering and/or extending along theoretical luminance levels, which theoretical chromaticity deviations are expected for said range for a respective differing theoretical black level drift, which is an offset from a true black level, in view of characteristics and/or image processing settings of said image sensor; and determine when a matching candidate is found, that a black level drift of said image sensor is equivalent to the theoretical black level drift of said matching candidate.

12. The deviation analyzing system according to claim 10, wherein the controller is further configured to adjust the black level setting of said image sensor based on said theoretical black level drift of said matching candidate.

13. The deviation analyzing system according to claim 12, wherein said controller is adapted for adjusting the black level setting based on said theoretical black level drift of said matching candidate when chromaticity deviations of one or more further captured images match said matching candidate.

* * * * *